T. G. PALMER.
NUT LOCK.
APPLICATION FILED AUG. 9, 1910.
998,795.
Patented July 25, 1911.
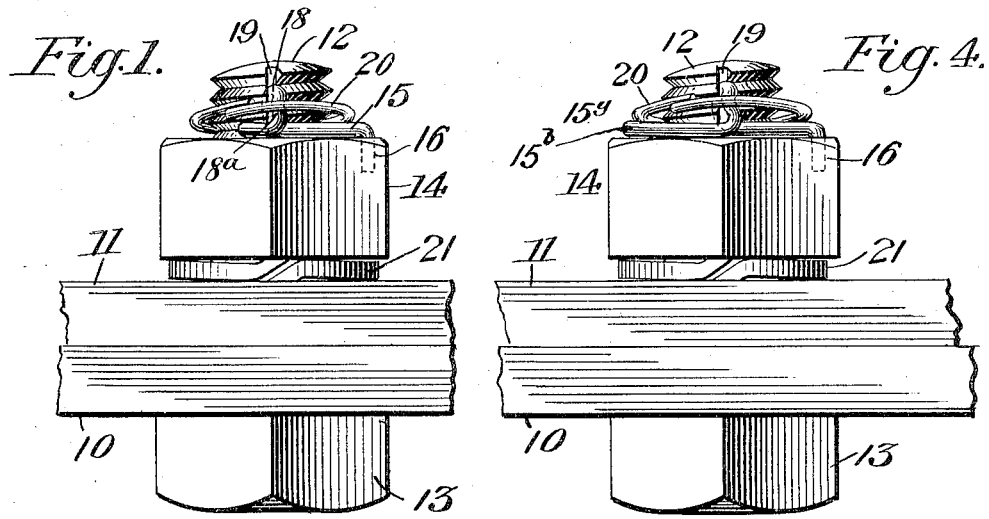
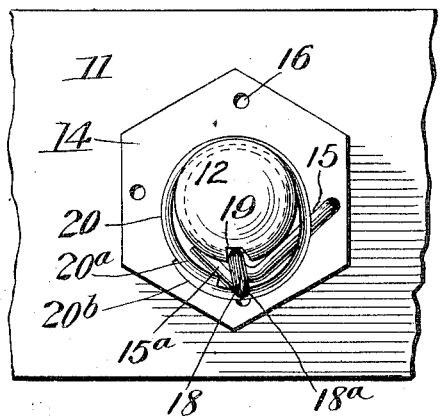
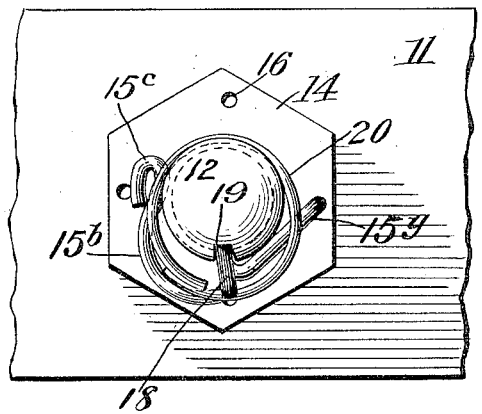
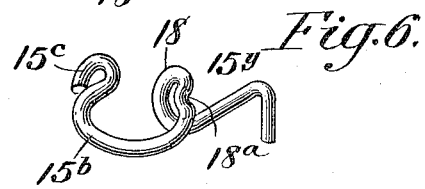
Witnesses.
Inventor.
Truman G. Palmer,
by Pennie Goldsborough & O'Neill
Attys.

UNITED STATES PATENT OFFICE.

TRUMAN G. PALMER, OF CHICAGO, ILLINOIS.

NUT-LOCK.

998,795.  Specification of Letters Patent.  Patented July 25, 1911.

Application filed August 9, 1910.  Serial No. 576,354.

*To all whom it may concern:*

Be it known that I, TRUMAN G. PALMER, a citizen of the United States, residing at Chicago, county of Cook, and State of Illinois, have invented certain new and useful Improvements in Nut-Locks; and I do hereby declare the following to be a full, clear, and exact description of the invention, such as will enable others skilled in the art to which it appertains to make and use the same.

This invention relates to nut locks, and it has special reference to nut locks of the type described in my prior application, Ser. No. 548,641, filed March 11, 1910, wherein the nut lock is shown as comprising, in combination with a longitudinally grooved bolt, and a nut thereon, a locking member freely set and swiveled in an opening in one of the nut faces and formed to embrace and directly engage the bolt, said member having a projection to take into the bolt groove. The engagement of said projection with the bolt groove prevents the relative turning movement of the nut and bolt, while the longitudinal movement of the locking member relatively to the nut and bolt is prevented by the gripping action of the locking member in the valley of the bolt thread.

The object of the present invention is to provide for an especially reliable engagement of the locking member in the bolt groove, and an especially efficient gripping action of the locking member in the bolt thread; and in order to obtain the best results in this connection I employ an auxiliary clamping or locking member which is formed as a separate entity and can be easily placed over the bolt and locking member in such a way as to obtain the results just noted. As long as this auxiliary clamping member, which preferably takes a ring-like form and embraces the bolt and locking member, occupies its locking position, the parts are effectively held against dislocation, but when it is desired to adjust the parts the auxiliary clamping member may be easily and quickly dismounted.

In the accompanying drawing:—Figure 1 is a side elevation of a nut lock embodying the invention, Fig. 2 is a top plan view of the parts shown in Fig. 1, Fig. 3 is a detail view of the main locking member shown in Figs. 1, and 2, and Figs. 4, 5 and 6 are views corresponding to Figs. 1, 2 and 3, respectively, but illustrating a main locking member of somewhat modified form.

Referring to the drawing, and more particularly to Figs. 1 to 3, 10 and 11 denote two parts bolted together by a bolt 12 having the usual head 13 and nut 14. The main locking member 15, which corresponds closely in character to those illustrated in my prior application, is designed to be freely set and swiveled in any one of a number of holes or sockets 16 in the outer nut face, just as in my prior construction. The locking member is, however, of considerably less length in the present instance, though it is set in any one of the sockets by means of its post 17, as before, and embodies a projection 18 (preferably formed as an eye) to engage the longitudinal bolt groove 19. The locking member is continued beyond the projection 18 only to a comparatively short distance, having a short extension 15$^a$ which extends into the valley of the thread near the groove 19, as shown in Fig. 2. The locking member is held in the position shown by means of an auxiliary clamping device 20, which preferably takes the form of a divided wire ring having overlapping end portions 20$^a$, 20$^b$.

By placing the ring like clamping member 20 over the end of the bolt and around the locking projection 18 of the main locking member, said projection is effectively clamped in the bolt groove 19, as indicated, and inasmuch as a portion of the ring 20 is held in the bolt thread while another portion rests in a small seat or indentation 18$^a$ formed in the projection 18, the movement of the main locking member in a direction longitudinally of the bolt and away from the seat 16 is absolutely prevented, even in case the short extension 15$^a$ does not engage the thread properly. The clamping ring 20 is preferably of spring-like character, and it will be understood that under these circumstances it constantly pulls the locking member 15 inward with respect to the bolt so that the proper locking engagement is maintained.

In order to make the locking action still more effective, I find it expedient in some cases to interpose a split washer 21 of the well known type between the nut 14 and the adjacent part 11, so that a longitudinal thrust will be imposed on the nut to bind it tightly against the bolt thread.

It is manifest that both the main locking member and the auxiliary clamping member can be readily assembled in the manner shown and that the structure may be easily dismounted, or taken apart. If the parts are in the position shown in Figs. 1 and 2 and it is desired to give the nut a further adjustment on the bolt, the ring 20 can be readily slipped off from the bolt to enable the locking member 15 to be swung out of the bolt groove. When the adjustment has been effected the parts are replaced in an obvious manner, with the post of the main locking member in the proper hole or socket of the nut.

The arrangement shown in Figs. 5 to 6 is identical with that just described with the exception that the locking member $15^y$ is of a modified form. In place of the short extension $15^a$, said locking member is provided with a longer extension $15^b$ extending around the bolt to a greater degree and having a terminal eye $15^c$ seated in the bolt thread at a point which may be substantially opposite that where the locking member is swiveled, as shown. In this case the locking member itself has a gripping action on the bolt, as according to my prior application, and the clamping ring 20 assumes less importance, although it is highly expedient to use it in order to make the locking engagement thoroughly reliable.

Without limiting myself to the precise construction shown, I claim:—

1. In a nut lock, the combination with a longitudinally grooved bolt, and a nut thereon, of a locking member swiveled on one of the nut faces and having a projection to take into the bolt groove, and a separate or auxiliary clamping member to hold said projection in said groove, embracing the bolt.

2. In a nut lock, the combination with a longitudinally grooved bolt, and a nut thereon, of a locking member swiveled on one of the nut faces and having a projection to take into the bolt groove, and a separate or auxiliary clamping member formed to embrace the bolt and said locking member.

3. The combination with a longitudinally grooved bolt, and a nut thereon, of a locking member swiveled on one of the nut faces and having a projection to take into the bolt groove, and a ring like clamping member to embrace the bolt and a portion of said locking member and thereby hold said projection in the bolt groove.

4. The combination with a longitudinally grooved bolt, and a nut thereon, of a locking member freely set in an opening in the outer nut face and having a projection to take into the bolt groove, said member having means to lie in the bolt thread, and a resilient split ring to embrace the bolt and the projection of said locking member.

In testimony whereof I affix my signature, in presence of two witnesses.

TRUMAN G. PALMER.

Witnesses:
U. C. LINCOLN,
CHARLES HERMANN.